United States Patent [19]

Bassett

[11] Patent Number: 4,981,898

[45] Date of Patent: Jan. 1, 1991

[54] POLYCARBONATE-POLYESTER BLENDS

[75] Inventor: Walt H. Bassett, Evansville, Ind.

[73] Assignee: General Electric Company, Mt. Vernon, Ind.

[21] Appl. No.: 139,927

[22] Filed: Dec. 31, 1987

[51] Int. Cl.[5] ............................................. C08K 3/32
[52] U.S. Cl. .................................... 524/417; 524/414; 524/537; 524/539; 524/605; 524/611
[58] Field of Search ........................ 524/417, 414, 537

[56] References Cited

U.S. PATENT DOCUMENTS

| | | | |
|---|---|---|---|
| 3,953,539 | 4/1976 | Kawase et al. | 524/537 |
| 4,346,028 | 8/1982 | Griffith | 523/451 |
| 4,360,625 | 11/1982 | Griffith | 524/414 |
| 4,532,290 | 7/1985 | Jaquiss et al. | 524/417 |

Primary Examiner—Lewis T. Jacobs
Attorney, Agent, or Firm—William Mufatti; Daniel DeJoseph

[57] ABSTRACT

A composition comprising a blend of a polyester resin and a polycarbonate resin are provided with a transesterification reaction hindering amount of a metaphosphate fiber.

10 Claims, No Drawings

POLYCARBONATE-POLYESTER BLENDS

This invention relates generally to polycarbonate-polyester resin compositions, alone, or in further combination with other resins, and more particularly to methods for stabilizing blends of high molecular weight linear thermoplastic polycarbonates and polyesters against undesirable transesterification reactions.

BACKGROUND OF THE INVENTION

High molecular weight linear polyesters and copolyesters are well known and have enjoyed continued and increasing commercial success. These are especially useful resins because they provide compositions with excellent moldability, and molded articles therefrom having smooth and glossy surface appearance, high strength, stiffness temperature resistance and other desirable properties.

Additionally, these resins may be modified to improve certain physical properties and further broaden their scope of application by incorporating therein various additives including fillers and reinforcing agents to enhance toughness and vary the stiffness of the material.

Blends of such polyester resins with one or more second resins have become of significant commercial interest because such second resins, carefully selected, can greatly improve impact strength, as well as tensile strength, modulus and distortion temperature under load in parts molded from such compositions. By way of illustration, such second resins can compromise minor proportions of aromatic polycarbonate resins, as described for example, in Kawase et al, U.S. Pat. No. 3,953,539.

There is a tendency, in such polyester-polycarbonate blends, for there to be an undesirable transesterification reaction between the polyester resin and the polycarbonate resin. This chemical reaction is manifested by there being a yellowing of the resulting blended resin.

Therefore, there is a need in the art for a method of preventing or substantially hindering the transesterification reaction between polycarbonates and polyesters in mixed blends of said resins.

It has now been discovered that certain phosphate fibers, specifically metaphosphate fibers, have demonstrated the ability to inhibit the transesterification reaction between polyester resins and polycarbonate resins.

SUMMARY OF THE INVENTION

According to the present invention, there are provided thermoplastic compositions comprising a polycarbonate and at least one polyester resin in further combination with transesterification inhibiting amounts of a metaphosphate fiber.

DESCRIPTION OF THE INVENTION

The polyester resins utilized in this invention include, in general, linear saturated condensation products of diols and dicarboxylic acids, or reactive derivatives thereof. Preferably, they will comprise condensation products of aromatic dicarboxylic acids and aliphatic diols. It is to be understood that it is also possible to use polyesters such as poly(1,4-dimethylol cyclohexane dicarboxylates, e.g., terephthalates). In addition to phthalates, small amounts of other aromatic dicarboxylic acids, such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols. In any event, the preferred polyesters are well known as film and fiber formers, and they are provided by methods outlines in Whinfield, U.S. Pat. No. 2,465,319 and Pengilly, U.S. Pat. No. 3,047,539 and elsewhere. The preferred polyesters will comprise a poly(alkylene terephthalate, isophthalate or mixed isophthalate-terephthalate, e.g., up to 30 mole percent isophthalate), said alkylene groups containing from 2 to 10 carbon atoms, e.g., poly(ethylene terephthalate) or poly(1,4-butylene terephthalate). Because of its rapid crystallization from the melt, it is preferred to use poly(1,4-butylene terephthalate) as the normally flammable polyester resin component of the present compositions.

While poly(1,4-butylene terephthalate)homopolyester is the preferred poly(butylene terephthalate) polymer, copolyesters thereof are also suitable. Such copolyesters generally comprise at least about 70 mole percent, and preferably at least 80 mole percent, based on total monomer content, of butylene and terephthalate units. The comonomer may be either a dicarboxylic acid or diol or a combination of the two. Suitable dicarboxylic acid comonomers include the $C_8$ to $C_{16}$ aromatic dicarboxylic acids, especially the benzene dicarboxylic acids, i.e. phthalic and isophthalic acids and their alkyl, e.g. methyl, derivatives and $C_4$ to $C_{16}$ aliphatic and cycloaliphatic dicarboxylic acids including, for example, sebacic acid; glutaric acid; azelaeic acid; tetramethyl succinic acid; 1,2-, 1,3- and 1,4-cyclohexane dicarboxylic acids and the life, as mentioned above. Suitable diol comonomers include but are not limited to $C_2$ to $C_8$ aliphatic and cycloaliphatic diols, e.g. ethylene glycol, hexanediol, butanediol and 1,2-, 1,3- and 1,4-cyclohexanedimethanol. Other suitable diols are well known to those skilled in the art.

Polycarbonates suitable for use in the present invention are any of those known in the art. Especially preferred polycarbonates are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.30 to 1.0 dl/g as measured in methylene chloride at 25 C. In one embodiment, the polycarbonate are derived from dihydric phenols and carbonate precursors and generally contain recurring structural units of the formula;

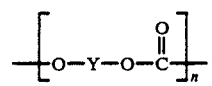

where Y is a divalent aromatic radical remaining after removal of the hydroxy groups from the dihydric phenol employed in the polycarbonate producing reaction, and n is greater than 1, and is preferably from about 10 to about 400.

Preferred polycarbonate resins are of the formula:

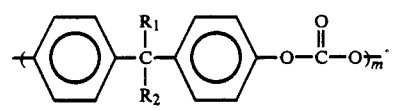

wherein $R_1$ and $R_2$ are independently hydrogen, (lower) alkyl or phenyl and m is at least 30 and preferably between 40 and 300. The term (lower) alkyl includes hydrocarbon groups of from 1 to 6 carbon atoms.

Suitable dihydric phenols for producing polycarbonates include, for example, 2,2-bis(4-hydroxyphenyl)propane, bis(4-hydroxyphenyl) methane, 2,2-bis(4-hydroxy-3-methylphenyl)propane, 4,4-bis(4-hydroxyphenyl) heptane, 2,2-(3,5,3',5'-tetrachloro-4,4'-dihydroxyphenyl)propane, 2,2-(3,5,3'5'-tetrabromo-4,4'-dihydroxyphenol)propane, and 3,3'- dichloro-4,4'-dihydroxydiphenyl)methane.

Other dihydric phenols which are also suitable for use in the preparation of the above polycarbonates are disclosed in U.S. Pat. Nos. 2,999,835; 3,038,365; 3,334,154; and 4,131,575, incorporated herein by reference.

It is, of course, possible to employ two or more different dihydric phenols or a copolymer of a dihydric phenol with a glycol or with a hydroxy or acid terminated polyester, or with a diabasic acid in the event a carbonate copolymer or interpolymer rather than a homopolymer is desired for use in the preparation of the blends of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate; a di(halophenyl)carbonate such as di(trichlorophenyl) carbonate, di(tribromophenyl)carbonate, etc.; di(alkylphenyl) carbonate such as di(tolyl)-carbonate, etc.; di(naphthyl)carbonate; di(chloronaphthyl)carbonate; etc., or mixtures thereof. The suitable haloformated include bis-haloformates of dihydric phenols (bischloroformates of hydroquinone, etc. or glycols (bishaloformates of ethYlene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. 4,430,484 and Kenneth Miller in U.S. Pat. No. 4,465,820, and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g. dichlorides. A quite useful class of polyestercarbonates are the aromatic polyester carbonates derived from bisphenol A; terephthalic acid or isophthalic acid or a mixture thereof or their respective acid chlorides; and phosgene. If a mixture of terephthalic acid and isophthalic acid is employed, the weight ratio of terephthalic acid to isophthalic acid may be from about 2:8 to about 8:2.

The polycarbonates of the subject blends can be manufactured by known processes, such as, for example, by reacting a dihydric phenol with a carbonate precursor such as diphenyl carbonate or phosgene in accordance with methods set forth in the above-cited literature and U.S. Pat. Nos. 4,018,750 and 4,123,436, or by transesterification processes such as are disclosed in the U.S. Pat. No. 3,153,008, as well as other processes known to those skilled in the art. The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalyst which can be employed are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, promellitric acid, pyromellitic dianhydride, mellitic acid, mellitic anhydride, trimesic acid, benzophenonetetracarboxylic acid, benxophenonetetracarboxylic anhydride, and the like. The preferred polyfunctional aromatic compounds are trimellitic anhydride and trimellitic acid or their acid halide derivatives.

The metaphosphate fibers that are utilized in this invention are preferably calcium and/or sodium metaphosphate fibers. The preferred metaphosphate fibers are calcium sodium metaphosphate fibers, which are disclosed in U.S. Pat. No. 4,346,028, which is incorporated herein by reference.

It has been discovered that any amount of the metaphosphate fibers will serve to hinder, to some extent, the transesterification reaction between the polycarbonates and polyester resins. Therefore, the precise amount used will be determined by the practitioner of the invention based on the specific resins used and the desired properties of the end composition.

Preferably, however, from about 0.01 parts to about 10 parts by weight of the metaphosphate fibers should be used, and most preferably, from about 0.1 parts to about 5 parts by weight should be used, based on 100 parts by weight of the total amount of polyester and polycarbonate resins in the composition. Although amounts slightly in excess of 10 parts by weight will not have any deleterious effects on the properties of the compositions, such percentages of the metaphosphate fibers will not further significantly decrease the transesterification reaction over the decrease that is shown when 10 weight percent of the metaphosphate fibers are employed.

The ratio of the polyester resins and polycarbonate resins is not important to the present invention, and may be determined by the individual practitioner of this invention.

The metaphosphate fibers of the invention may be mixed with the polymers described by any suitable means which are well known to those skilled in the art.

Those embodiments of the invention which are melt-stabilized flame retardant thermoplastic polycarbonate-polyester resin compositions are made by including the monosodium and/or monopotassium phosphate in compositions rendered flame retardant with an effective amount of one or more flame retardant additives in conventional ways. Such additives are, for example, bromine- or chlorine- containing compounds, e.g., decabromodiphenyl ether, a polycarbonate of tetrabromobisphenol A and biphenol A, and the like, alone, or preferably, combined with a synergist, such as antimony trioxide.

It is also within the scope of the invention to incorporate ingredients such as reinforcing fibers, plasticizers, dyes, pigments, various other heat and light stabilizers, mold release agents and stabilizers, anti-oxidants, antistatic agents, photochromic materials and the like, into the polyester-polycarbonate blended resin.

DESCRIPTION OF THE PREFERRED EMBODIMENTS

The following examples illustrate the present invention, but are not intended to limit the scope of the claims in any manner whatsoever. All parts are by weight unless otherwise specified.

Unless otherwise stated, all compositions were prepared by dry blending the ingredients by extrusion through a single screw extruder between 500°-560° F. The test specimens were molded into 2"×3"×1-⅛" chips using a 500° F. barrel temperature and 120 second cycle times.

The compositions of the Examples 1 and 6 set forth below are not within the scope of the invention, but show typical polyester-polycarbonate blended compositions without the incorporation therein of the metaphosphate fibers.

The test used to determine the degree of transesterification was the Yellowness Index, which was measured in a spectrometer according to the provisions of ASTM test methods No. D-1925.

TABLE

| Components | Example No. | | | | |
|---|---|---|---|---|---|
| | 1 | 2 | 3 | 4 | 5 |
| PE | 65 | 65 | 64.5 | 64 | 63 |
| BrPC | 21 | 21 | 21 | 21 | 21 |
| A.O.C. | 7.1 | 7.1 | 7.1 | 7.1 | 7.1 |
| Glass Fibers | 6.5 | 6.0 | 6.5 | 6.5 | 6.5 |
| Mold Release | .10 | .10 | .10 | .10 | .10 |

TABLE-continued

| | | | | | |
|---|---|---|---|---|---|
| Stab 1 | .15 | .15 | .15 | .15 | .15 |
| Stab 2 | .15 | .15 | .15 | .15 | .15 |
| MPF | — | 0.5 | 0.5 | 1.0 | 2.0 |
| Yellowness Index | 19.2 | 12.2 | 11.8 | 10.2 | 10.1 |

| Components | 6 | 7 | 8 | 9 |
|---|---|---|---|---|
| PE | 79.5 | 79.0 | 78.0 | 75 |
| PC | 20.0 | 20.0 | 20.0 | 20 |
| Stab 1 | 0.5 | 0.5 | 0.5 | 0.5 |
| MPF | — | 0.5 | 1.5 | 4.5 |
| Yellowness Index | 34.2 | 22.7 | 17.4 | 13.4 |

NOTE:
PE is poly(1,4-butylene terephthalate) manufactured by the General Electric Company.
BrPC is brominated poly(bisphenol A)carbonate manufactured by General Electric Company.
A.O.C. is antimony oxide concentrate in an ethylene vinyl acetate carrier.
The mold release used was Comboloob 0609, a polyester wax blend manufactured by Glyco Company.

The mold release used was Comboloob 0609, a polyester wax blend manufactured by Glyco Company.

Stabilizer 1 was Irganox 1076, a hindered phenolic stabilizer, Octadecyl-3,5-di-t-butyl-4-hydroxy hydrocinnanate, manufactured by Ciba-Geigy.

Stabilizer 2 was Teflon concentrate which was a 30/70 (by weight) mixture of Teflon 30 manufactured by DuPont and a polycarbonate resin manufactured by the General Electric Company.

MPF is metaphosphate fibers, which are calcium sodium metaphosphate fibers which are manufactured by Monsanto Company.

PC is a poly(bisphenol A)carbonate manufactured by General Electric Company as Lexan 121.

What is claimed is:

1. A thermoplastic composition comprising: (a) a polycarbonate resin; (b) at least one polyester resin; and (c) a transesterification hindering amount of a metaphosphate fiber.

2. The composition of claim 1 wherein said polyester resin is a poly(butyl terephthalate(resin.

3. The composition of claim 2 wherein the polyester resin is poly(1,4-butylene terephthalate).

4. The composition of claim 1 wherein the metaphosphate fibers are selected from the group of calcium metaphosphate fiber, sodium metaphosphate fiber, and calcium sodium metaphosphate fiber.

5. The composition of claim 4 wherein the metaphosphate fibers are calcium sodium metaphosphate fibers.

6. The composition of claim 5 wherein the polycarbonate resin is derived from a diphenol and phosgene or a phosgene precursor.

7. The composition of claim 6 wherein the polycarbonate resin is poly(bisphenol A)carbonate.

8. The composition of claim 1 wherein the said polyester resin comprises an admixture of poly(1,4-butylene terephthalate) and poly(ethylene terephthalate).

9. The composition of claim 1 which contains from about 0.01 parts to about 10 parts by weight of the metaphosphate fibers for every 100 parts by weight of the blended resin composition.

10. The composition of claim 9 which contains from about 0.1 to about 5 parts by weight of the metaphosphate fibers for every 100 parts by weight of the blended resin composition.

* * * * *